United States Patent
Farmer et al.

(10) Patent No.: US 9,588,229 B2
(45) Date of Patent: Mar. 7, 2017

(54) ENHANCED MULTIFUNCTIONAL PAINT FOR DETECTION OF RADIATION

(71) Applicant: Lawrence Livermore National Security, LLC, Livermore, CA (US)

(72) Inventors: Joseph C. Farmer, Tracy, CA (US); Edward Ira Moses, Livermore, CA (US); Alexander M. Rubenchik, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 107 days.

(21) Appl. No.: 14/659,848

(22) Filed: Mar. 17, 2015

(65) Prior Publication Data

US 2016/0274245 A1    Sep. 22, 2016

(51) Int. Cl.
| | |
|---|---|
| *G01T 1/10* | (2006.01) |
| *G01T 1/11* | (2006.01) |
| *C09D 5/32* | (2006.01) |
| *G01T 1/20* | (2006.01) |
| *B05D 1/12* | (2006.01) |
| *C23C 24/04* | (2006.01) |

(52) U.S. Cl.
CPC .............. *G01T 1/11* (2013.01); *B05D 1/12* (2013.01); *C09D 5/32* (2013.01); *C23C 24/04* (2013.01); *G01T 1/20* (2013.01)

(58) Field of Classification Search
CPC ....................................................... G01T 1/06
See application file for complete search history.

(56) References Cited

U.S. PATENT DOCUMENTS

| | | | | |
|---|---|---|---|---|
| 4,588,698 A | * | 5/1986 | Gruner | G01N 33/534 252/301.17 |
| 5,973,328 A | * | 10/1999 | Hiller | G01T 3/00 250/361 R |
| 7,780,913 B2 | | 8/2010 | Farmer | |
| 8,133,735 B2 | | 3/2012 | Farmer | |
| 2005/0208290 A1 | * | 9/2005 | Patel | C09K 11/06 428/323 |
| 2006/0022142 A1 | * | 2/2006 | Robinson | G01T 1/2002 250/370.11 |
| 2007/0048867 A1 | * | 3/2007 | Farmer | C09D 5/08 436/6 |
| 2014/0361179 A1 | * | 12/2014 | Simon | G01N 23/05 250/362 |
| 2015/0355346 A1 | * | 12/2015 | Weston | G01T 3/06 250/483.1 |
| 2016/0045841 A1 | * | 2/2016 | Kaplan | C22B 9/00 429/49 |

FOREIGN PATENT DOCUMENTS

GB    2404780 A  *  2/2005  ............... G01T 3/08

* cited by examiner

*Primary Examiner* — Kiho Kim
(74) *Attorney, Agent, or Firm* — Eddie E. Scott

(57) ABSTRACT

An enhanced multifunctional paint apparatus, systems, and methods for detecting radiation on a surface include providing scintillation particles; providing an enhance neutron absorptive material; providing a binder; combining the scintillation particles, the enhance neutron absorptive material, and the binder creating a multifunctional paint; applying the multifunctional paint to the surface; and monitoring the surface for detecting radiation.

18 Claims, 8 Drawing Sheets

ENHANCED MULTIFUNCTIONAL PAINT FOR DETECTION OF RADIATION

STATEMENT AS TO RIGHTS TO APPLICATIONS MADE UNDER FEDERALLY SPONSORED RESEARCH AND DEVELOPMENT

The United States Government has rights in this application pursuant to Contract No. DE-AC52-07NA27344 between the United States Department of Energy and Lawrence Livermore National Security, LLC for the operation of Lawrence Livermore National Laboratory.

BACKGROUND

Field of Endeavor

The present invention relates to detection and more particularly to paint for detection of radiological and chemical materials.

State of Technology

This section provides background information related to the present disclosure which is not necessarily prior art.

Radiological agents include radioactive releases for nuclear plants, releases from stored radioactive material, radiological bombs, dirty bombs, and other systems for releasing radioactive material. Current concerns about radiological warfare tend to be focused on bombs and on deliberate pollution of air, water, or ground. Some radiological agents are extremely virulent, and can kill over time with near-certainty at doses as low as one microgram.

U.S. Pat. No. 8,133,735 for Paint for Detection of Corrosion and Warning of Chemical and Radiological Attack provides the following state of technology information. The detection of chemical and radiological warfare agents can be accomplished through direct or instrument-assisted visual inspection. Such paints and coatings can warn soldiers of chemical and radiological attack. This feature can be added to tactical vehicles during maintenance operations. The use of paints inside buildings, trains, and subway tunnels would provide a means of detecting the presence of chemical and radiological warfare agents over large surfaces.

U.S. Pat. No. 7,780,913 for Paint for Detection of Corrosion and Warning of Chemical and Radiological Attack provides the following state of technology information. A system for warning of corrosion, chemical, or radiological substances. The system comprises painting a surface with a paint or coating that includes an indicator material and monitoring the surface for indications of the corrosion, chemical, or radiological substances.

SUMMARY

Features and advantages of the disclosed apparatus, systems, and methods will become apparent from the following description. Applicant is providing this description, which includes drawings and examples of specific embodiments, to give a broad representation of the apparatus, systems, and methods. Various changes and modifications within the spirit and scope of the application will become apparent to those skilled in the art from this description and by practice of the apparatus, systems, and methods. The scope of the apparatus, systems, and methods is not intended to be limited to the particular forms disclosed and the application covers all modifications, equivalents, and alternatives falling within the spirit and scope of the apparatus, systems, and methods as defined by the claims.

The disclosed paints/coatings apparatus, systems, and methods provide enhanced detection of radiological substances. The disclosed paints/coatings apparatus, systems, and methods comprise painting a surface with a paint or coating that includes an indicator material and monitoring the surface for indications of the radiological substances. One embodiment of the present invention provides a system that comprises paint on a surface that warns of radiological substances. The paint is operatively connected to the surface and an indicator material carried by the paint provides an indication of the radiological substances. Throughout this application the terms paint(s) and coating(s) are used interchangeably.

The disclosed paints/coatings apparatus, systems, and methods provide an improved multifunctional paint that (1) modifies paint pigment to enhance the level of detection possible, through the selective specific adsorption of radionuclides on the surface of pigments; and (2) enables the detection of neutrons, through incorporation of a secondary pigment with a very high coefficient for the absorption of thermal neutrons, with the emission of a gamma ray during the detection.

The disclosed paints/coatings apparatus, systems, and methods can be used for detection of widespread radioactive contamination due to a nuclear accident such as Three Mile Island or Fukushima. The detection of neutrons over a very large solid angle, using neutron-detection coatings of various thickness, ranging from very thin to very thick. Enabling energy discrimination through the creation of multi-layer paint coatings, with intervening layers to absorb and screen-out neutrons of lower energy.

By using such paints in tunnels and structures that might become contaminated with radioactive materials, decontamination efforts could be enhanced since the exact locations of contamination could be easily detected, using either a camera or more sensitive systems. The paints could be reset during the decontamination effort, so that progress could be monitored. There are many other attractive applications of such material. These paints are inexpensive, easy to deploy on massive surfaces, and easy to interrogate.

Protective paints and coatings have been developed and tested that can detect radiological agents in the environment (buildings, rooms, and other facilities) by incorporating special pigments into an organic polymeric binder that can be applied as a paint or coating. These paints and coatings enable the detection of such radioactive sources and contaminants through scintillation of the inorganic or organic pigment, which is selected based upon the particle being detected (alpha, beta or gamma). Multifunctional paints can be formulated that enable the simultaneous detection of alpha, beta and gamma rays, with energy discrimination.

The disclosed paints/coatings apparatus, systems, and methods enable the detection of radiological agents through direct or instrument-assisted inspection. The disclosed paint (the term "paint" includes "coatings") apparatus, systems, and methods have many uses including use (1) as paints for buildings and equipment in industrial plants involved in the production of nuclear and radiological materials; (2) as paints for the inside of nuclear power plants, nuclear powered ships, and submarines; (3) as paints for trucks and shipping containers and road-side facilities along shipping routes; (5) as paints for unmanned aerial vehicles, micro airships, and other surveillance devices; (6) as paints for the detection and monitoring of activities involving radiological materials; and (7) as paints for proving warnings. Such paints can warn soldiers of radiological attack. This feature can be added to tactical vehicles during maintenance operations. The use of paints inside buildings, trains, and subway tunnels would provide a means of detecting the presence of radiological agents over large surfaces.

The apparatus, systems, and methods are susceptible to modifications and alternative forms. Specific embodiments are shown by way of example. It is to be understood that the apparatus, systems, and methods are not limited to the particular forms disclosed. The apparatus, systems, and methods cover all modifications, equivalents, and alternatives falling within the spirit and scope of the application as defined by the claims.

BRIEF DESCRIPTION OF THE DRAWINGS

The accompanying drawings, which are incorporated into and constitute a part of the specification, illustrate specific embodiments of the apparatus, systems, and methods and, together with the general description given above, and the detailed description of the specific embodiments, serve to explain the principles of the apparatus, systems, and methods.

DETAILED DESCRIPTION OF SPECIFIC EMBODIMENTS

Figure 1:
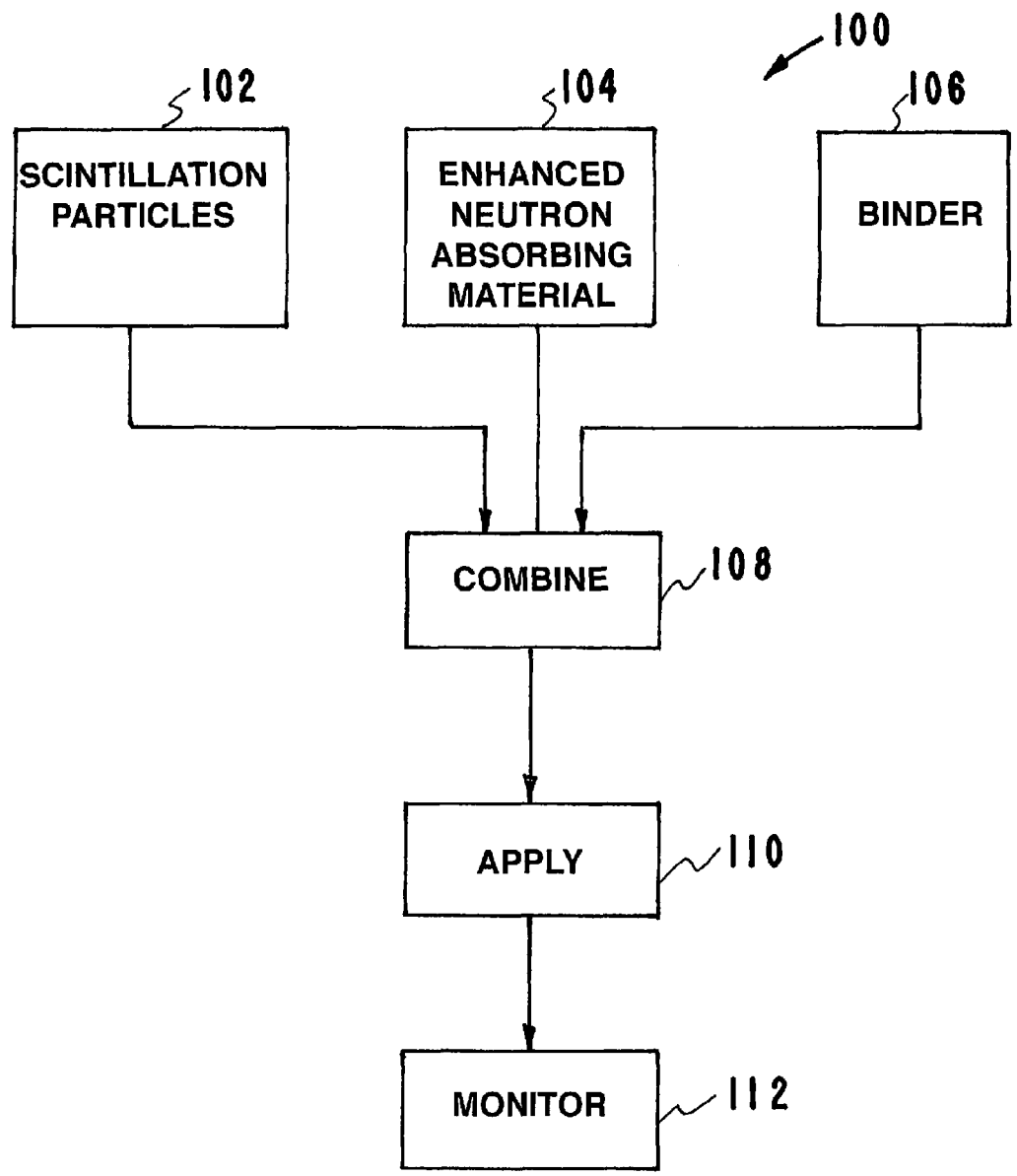
FIG. 1 is a flow chart that illustrates a method for manufacturing an enhanced multifunctional paint (EMP).

Referring to the drawings, to the following detailed description, and to incorporated materials, detailed information about the apparatus, systems, and methods is provided including the description of specific embodiments. The detailed description serves to explain the principles of the apparatus, systems, and methods. The apparatus, systems, and methods are susceptible to modifications and alternative forms. The application is not limited to the particular forms disclosed. The application covers all modifications, equivalents, and alternatives falling within the spirit and scope of the apparatus, systems, and methods as defined by the claims.

Figure 2:
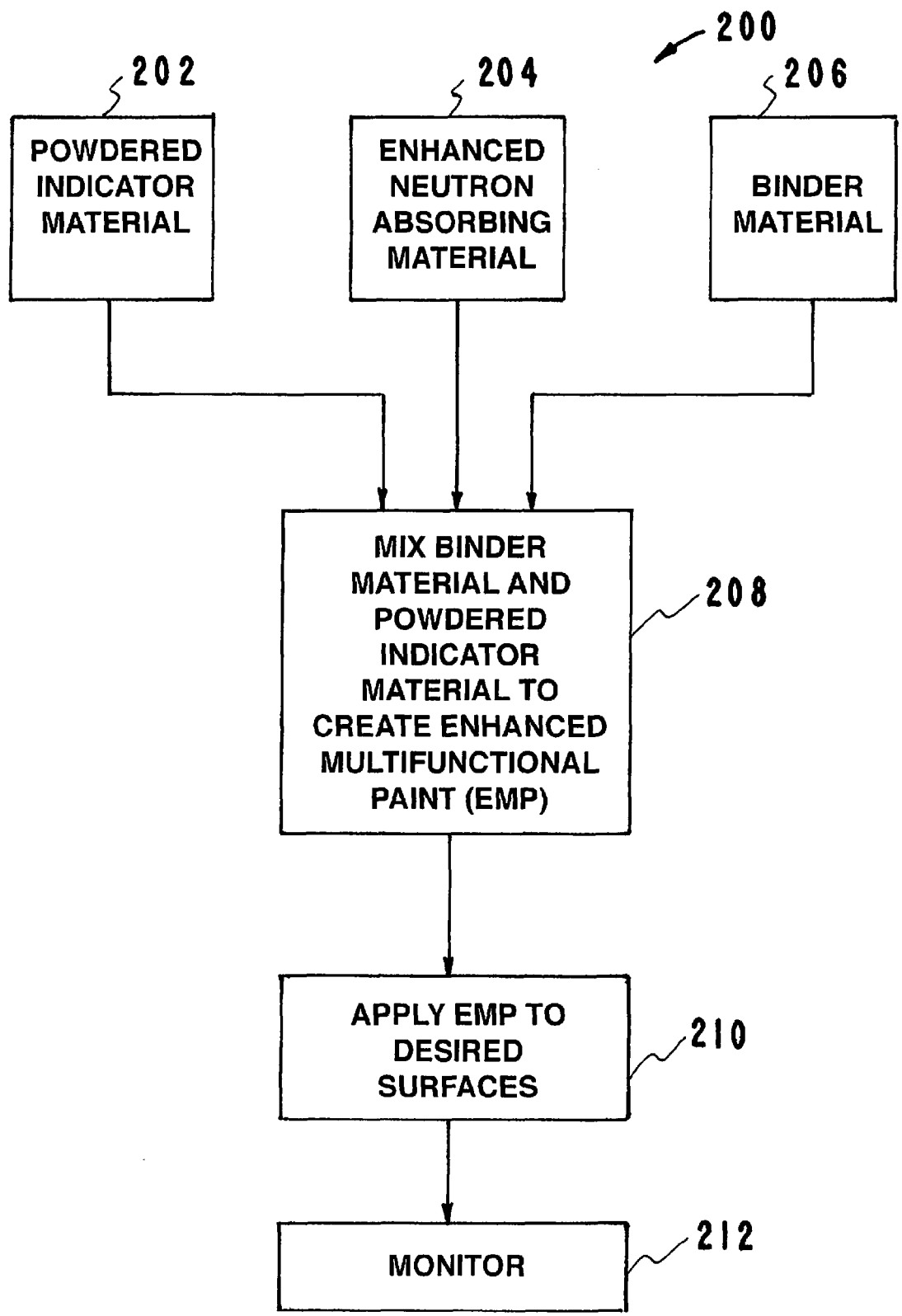
FIG. 2 is another flow chart that illustrates another method of manufacturing an enhanced multifunctional paint (EMP).

Referring now to the drawings and in particular to FIGS. 1 and 2, Applicant's enhanced multifunctional paint apparatus, systems, and methods for detection of radiation are illustrated. FIG. 1 illustrates a liquid paint system and FIG. 2 illustrates a powdered paint system. Radiation-sensitive paints and coatings can be used to monitor exposure in various scenarios of interest: (1) as paints for buildings and equipment in industrial plants involved in the production of nuclear and radiological materials; (2) as paints for the inside of nuclear power plants, nuclear powered ships, and submarines; (3) as paints for trucks and shipping containers and road-side facilities along shipping routes; (5) as paints for unmanned aerial vehicles, micro airships, and other surveillance devices; and (6) as paints for the detection and monitoring of activities involving radiological materials.

In addition to enabling the long-term exposure (dose) of operating personnel in nuclear plants and nuclear-powered ships to be monitored, surfaces coated with these paints can be used to track and image the spread of radioactive contamination. Ultimately, thermo-luminescent paints and coatings could be used as a basis for qualifying the receipt of shipping containers for acceptance into the United States, where such qualification could be done through field interrogation of the painted surface, or through quantification of sampled paint chips. These coatings can also be used on aircraft, to detect corrosion damage underneath protective coatings, by enabling the unexpected movement of ion-implanted tracers (such as Tc-99) to be detected and monitored.

These coatings can also be used in the detection of widespread radioactive contamination due to a nuclear accident such as Three Mile Island or Fukushima. The detection of neutrons over a very large solid angle, using neutron-detection coatings of various thickness, ranging from very thin to very thick. Enabling energy discrimination through the creation of multi-layer paint coatings, with intervening layers to absorb and screen-out neutrons of lower energy.

By using such paints in tunnels and structures that might become contaminated with radioactive materials, decontamination efforts could be enhanced since the exact locations of contamination could be easily detected, using either a camera or more sensitive systems. The paints could be reset during the decontamination effort, so that progress could be monitored. There are many other attractive applications of such material. These paints are inexpensive, easy to deploy on massive surfaces, and easy to interrogate.

FIG. 1 is a flow chart that illustrates a method for manufacturing an enhanced multifunctional paint (EMP). The apparatus, systems, and methods are designated collectively and generally by the reference numeral 100. The apparatus, systems, and methods 100 are illustrated by a flow chart in FIG. 1. The flow chart illustrates the steps:

Step 102—providing scintillation particles;

Step 104—providing an enhance neutron absorptive material;

Step 106—providing a binder;

Step 108—combining the scintillation particles, the enhance neutron absorptive material, and the binder creating a multifunctional paint;

Step 110—applying the multifunctional paint to a surface; and

Step 110—monitoring the surface for detecting radiation.

In the first step a supply of three materials is required. The first material is composed of scintillation particles 102, the second material is an enhanced neutron absorbing material 104, and the third material is a binder 106. In the second step 108 the three materials are combined to make the enhanced multifunctional paint (EMP). The third step 110 is applying the EMP to a desired surface. The final step 112 is the monitoring of the treated surface. The monitoring might be done to keep a record of changes to the treated surface or to monitor some event at some time in the future, such as exposure to radiation.

Numerous methodologies can be used for the production of scintillating paints and coatings for detecting the presence of radiological agents on or near surfaces, and for the production of thermo luminescent paints and coatings for quantifying long-term exposure to doses of radiation, which may or may not be present at the time of interrogation. These coatings incorporate scintillation and/or thermo-luminescent materials as pigments. Pigment particles are covered with a chemisorptive material to concentrate radionuclides in close proximity to the pigment, thereby enhancing the probability of scintillation, thermoluminescence, and detection. Boron-containing secondary pigment particles can be added to capture neutrons, thereby liberating alpha particles and gamma rays, which can also be detected via scintillation or thermoluminescence.

The multifunctional paint for system for detection of radiation 100 modifies the paint to enhance the level of detection possible through the selective specific adsorption of radionuclides and enhances detection through incorporation of a material with a very high coefficient for the absorption of neutrons during the detection process. Applicant's preferred embodiment for enhancing the adsorptive-capture of radionuclides in close proximity to pigment particles capable of scintillating in their presence include coatings of silica and carbon aerogel or other high-surface area materials capable of radionuclide chemisorption. Applicant's preferred embodiment for the neutron-absorption pigment is some material containing the boron-10 isotope. Such materials are known to absorb thermal neutrons, thereby forming metastable boron-11. The metastable boron-11 decays in approximately one picosecond, yielding a 1.47 MeV alpha particle, a 0.87 MeV lithium-7 atom, and a 0.48 MeV gamma ray. Chemically stable forms of boron-10 are favored, such as boron carbide (B4C). Other forms of boron can be used for the neutron-absorption pigment.

FIG. 2 is another flow chart that illustrates another method of manufacturing an enhanced multifunctional paint (EMP). A supply of three materials is obtained, the three materials being first a powdered indicator material 202, second an enhanced neutron absorbing material 204, and third a binder material 206. In step 208 the three materials are combined to form an (EMP). Step 210 is to apply the EMP to a desired surface. The final step 212 is the ability to monitor the surface treated with the EMP for an historical record or monitor the surface if it is suspected that is has become contaminated perhaps by some nuclear event.

Processes for Producing Enhanced Multifunctional Paint

Numerous methodologies can be used for producing Applicant's enhanced multifunctional paint coating for detecting the presence of radiological agents on or near surfaces some of which are listed and identified below.

Spray-on paints or coatings with organic polymeric binders

Brush-on paints or coatings with organic polymeric binders

Coatings and films produced with web coater and organic polymeric binders

Powder coatings

Coatings with Inorganic Ceramic/Metallic Binders

Cold-spray processes

Thermal-spray processes

Figure 3:
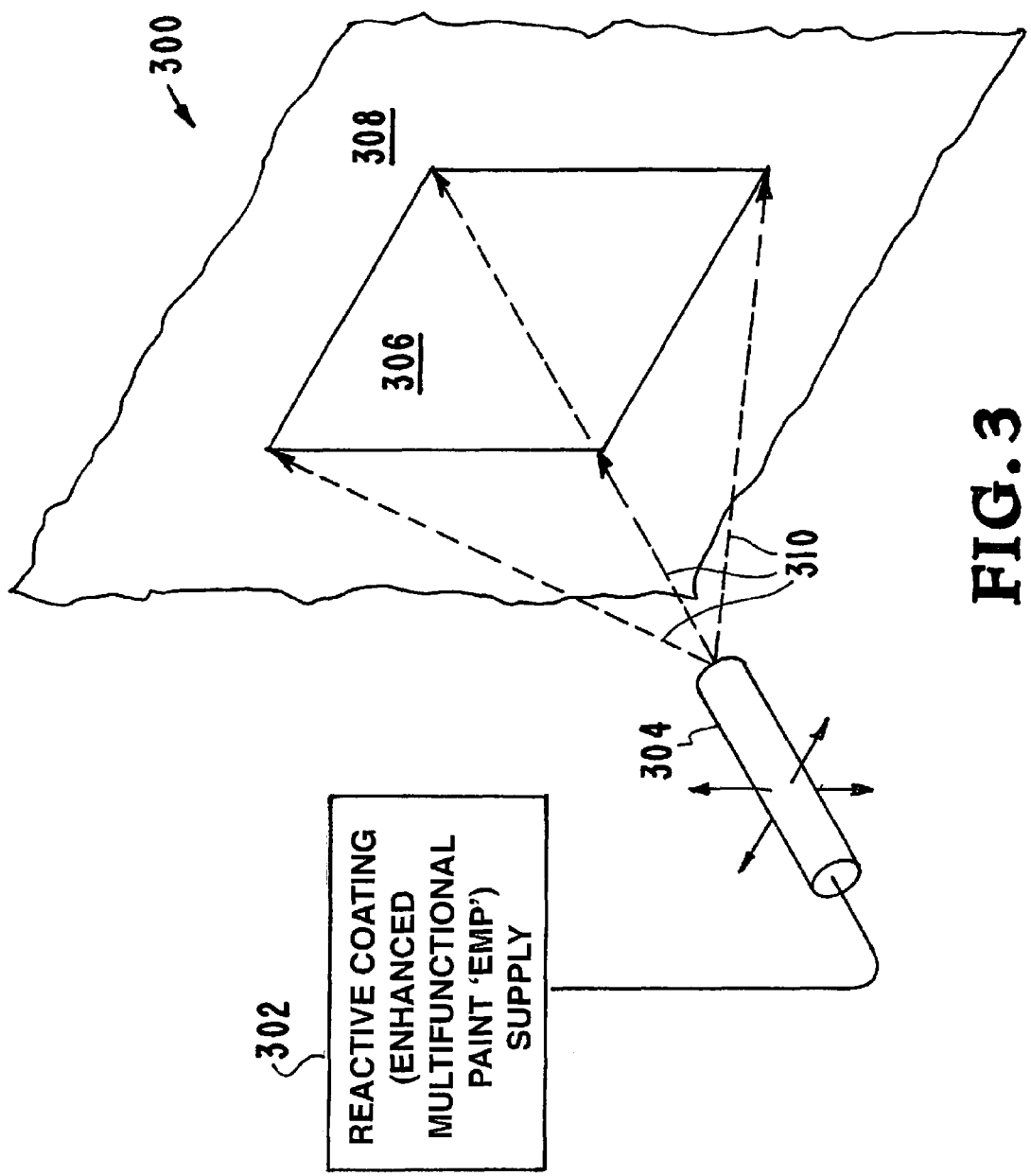
FIG. 3 shows an area such as a wall of a structure having some area being coated with the EMP.
Figure 4:
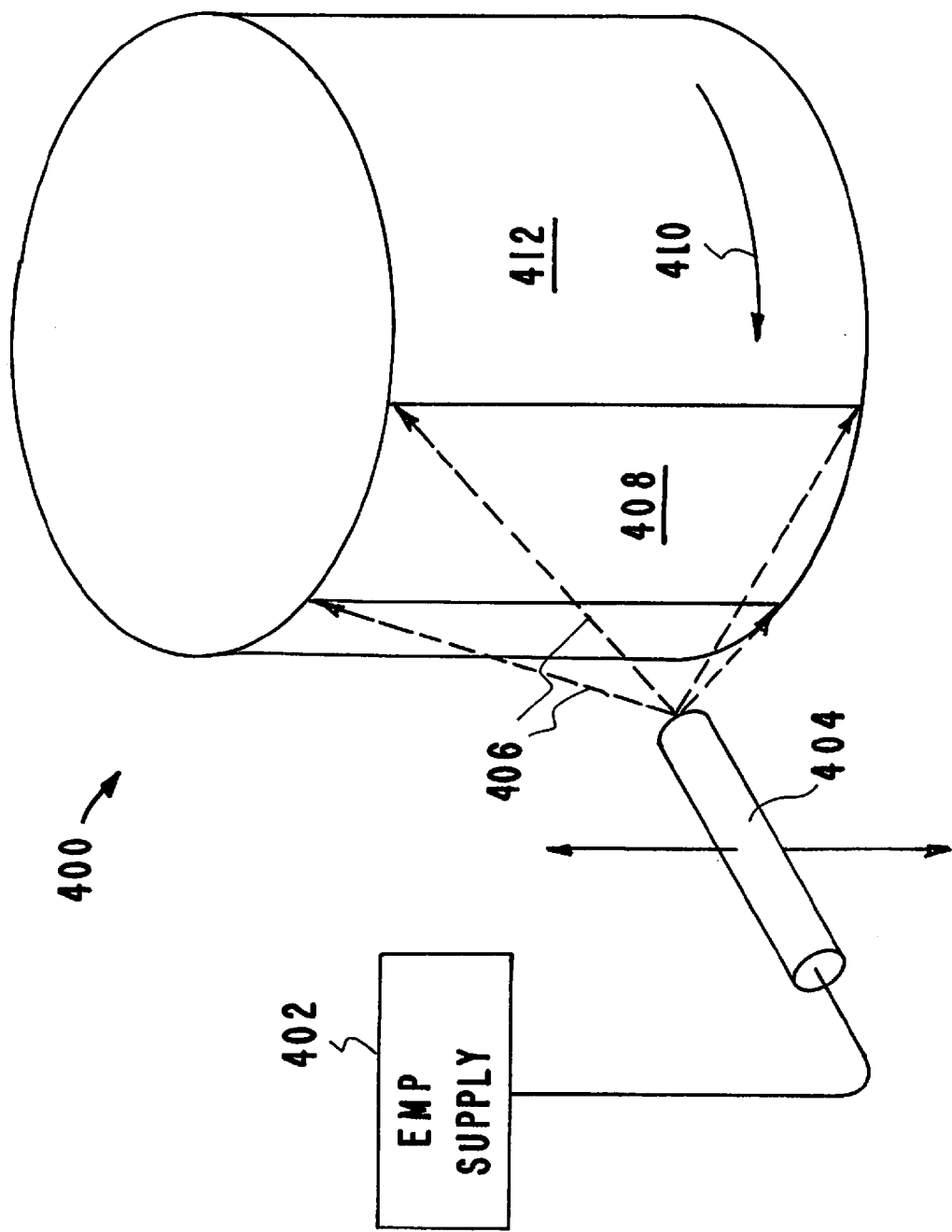
FIG. 4 shows a drum like object being treated with the EMP.
Figure 5:
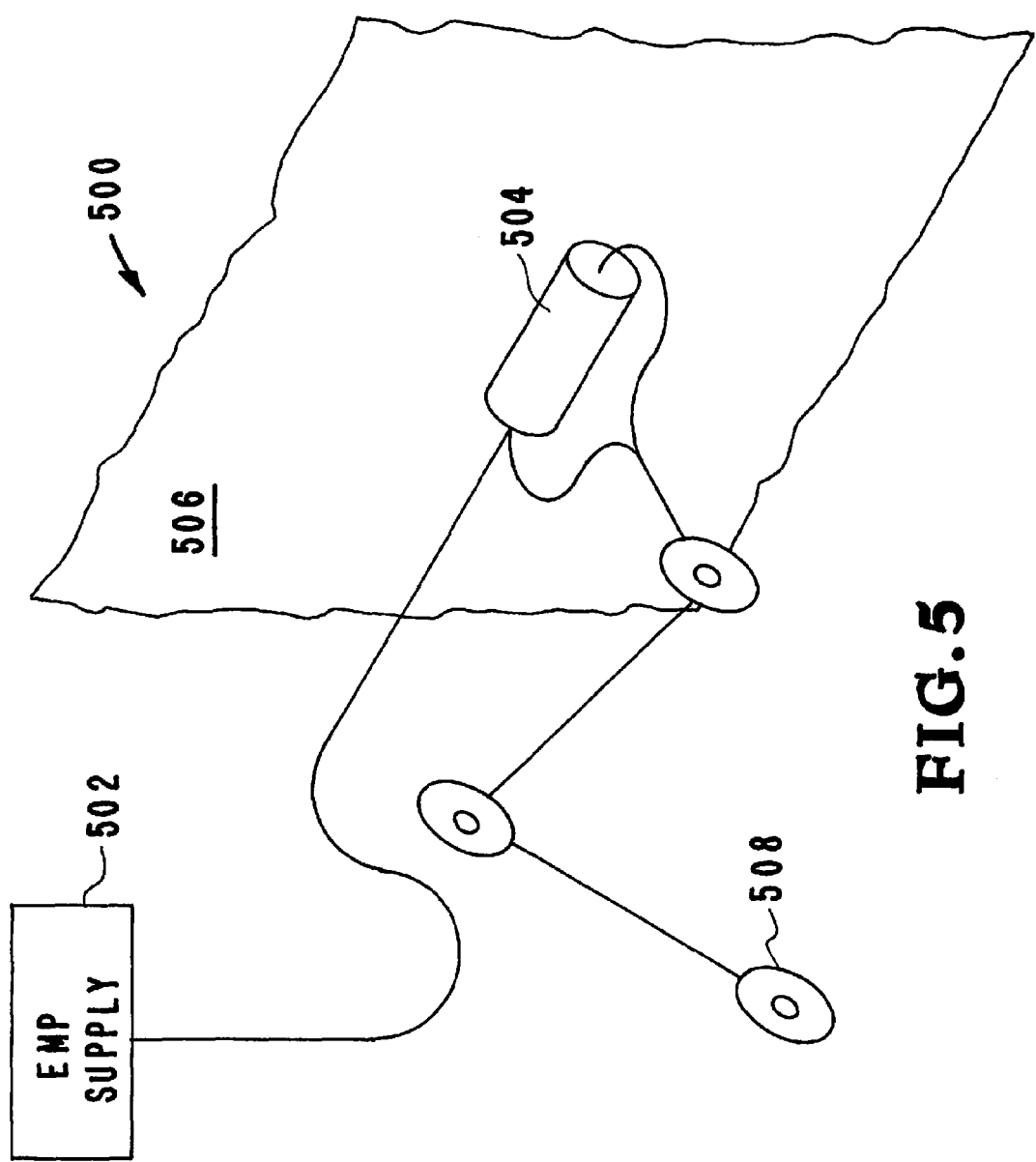
FIG. 5 illustrates a roller on an articulated arm system.

Referring now to FIGS. 3, 4, and 5; three methodologies are illustrated that can be used for applying Applicant's enhanced multifunctional paint coating for detecting the presence of radiation. FIG. 3 illustrates application to an area such as a wall of a structure. FIG. 4 shows a drum like object being treated with the paint. FIG. 5 illustrates a roller on an articulated arm system.

FIG. 3 shows an area such as a wall of a structure 308 having some area 306 being coated with the EMP. There is an EMP supply 302 and a movable spray device 304 that produces a pattern of spray 310. The structure having the EMP applied to may be completely treated with the EMP or just discrete area may be treated.

FIG. 4 shows a drum like object 412 being treated with the EMP. There is an EMP supply 402 and a moveable spray apparatus 404 shown applying the EMP in a spray pattern 406 to the drum like object 412 that can be on a turntable not shown and rotated in the direction of arrow 410 to facilitate the coating process.

FIG. 5 illustrates a roller 504 on an articulated arm system 508. The roller applicator 504 is connected to an EMP supply 502. The roller 504 is a moveable application apparatus for applying the EMP in a pattern to the surface 506.

Figure 6:
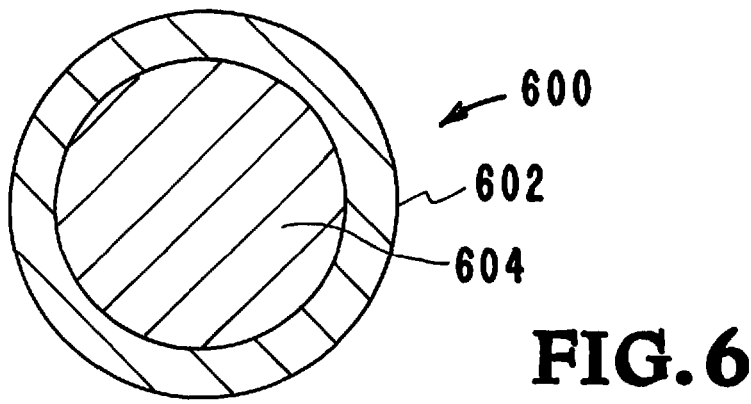
FIG. 6 shows a capsule that consists of a scintillation material that is encased in an enhanced neutron absorbing material.

FIG. 6 shows a capsule 600 that consists of a scintillation material 604 that is encased in an enhanced neutron absorbing material 602. As shown in FIG. 6 the enhanced neutron absorbing material 602 is a coating on the scintillation particles 604. In one embodiment, the coating 602 on the scintillation particles 604 includes a neutron absorptive material comprises a coating of high-surface area materials capable of radionuclide chemisorption. In one embodiment, the coating 602 on the scintillation particles 604 includes a silica neutron absorptive material. In one embodiment, the coating 602 on the scintillation particles 604 includes a carbon aerogel neutron absorptive material.

Figure 7:
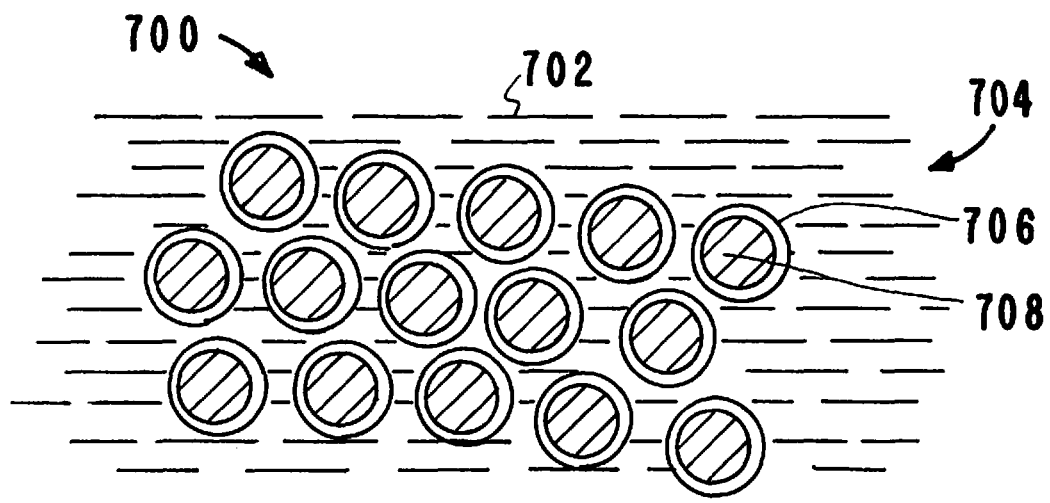
FIG. 7 shows the capsules of FIG. 6 with scintillation material and enhanced neutron absorbing material combined with a binder material to create an EMP.

FIG. 7 shows the capsules of FIG. 6 with scintillation material 708 and enhanced neutron absorbing material 706 combined with a binder material 702 to create an EMP 704.

Figure 8:
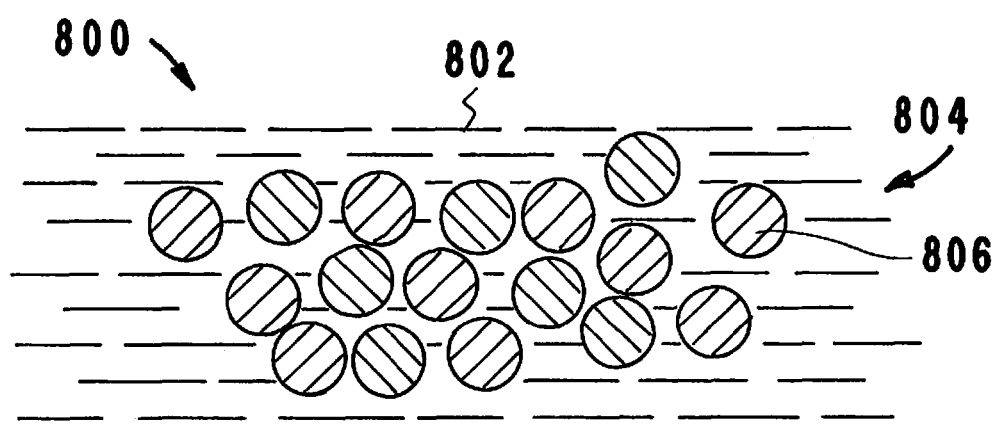
FIG. 8 illustrates an alternate method of creating an EMP.

FIG. 8 illustrates an alternate method of creating an EMP. Here the binder material 802 contains a mixture of particles 806 of both scintillation material and enhanced neutron absorbing material to form an EMP 804.

Figure 9:
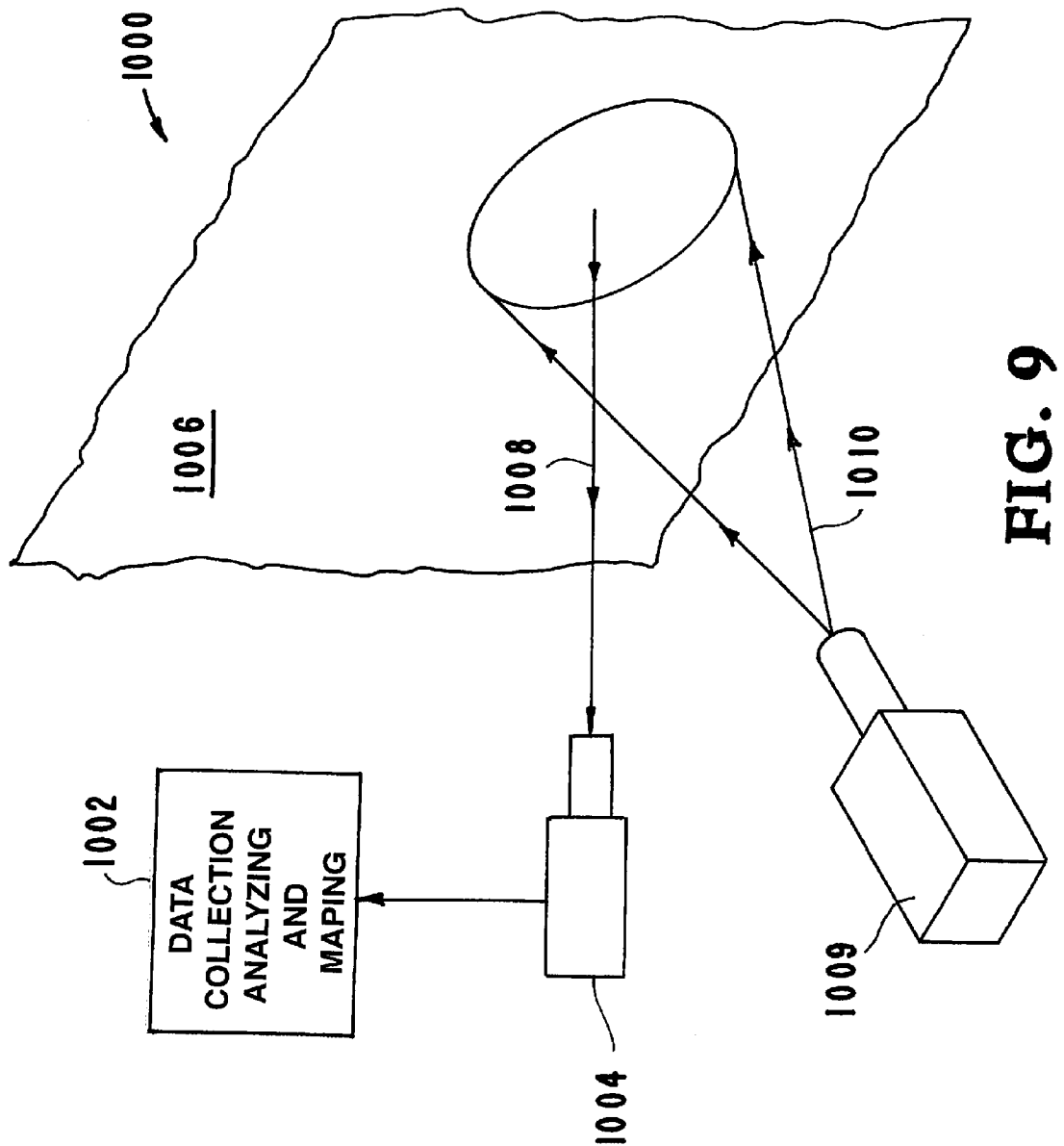
FIG. 9 shows a surface that has been treated with the EMP being interrogated for possible radiation exposure.

FIG. 9 shows a surface 1006 that has been treated with the EMP being interrogated for possible radiation exposure. A heat source (laser) 1009 projects a beam 1010 onto the treated surface 1006. If the treated surface 1006 has received radiation exposure the heated area will give off thermal luminesce 1008. A camera or photomultiplier 1004 will detect the thermal luminesce 1008 and send this information to a data collection system 1002 for analysis and mapping.

Figure 10:
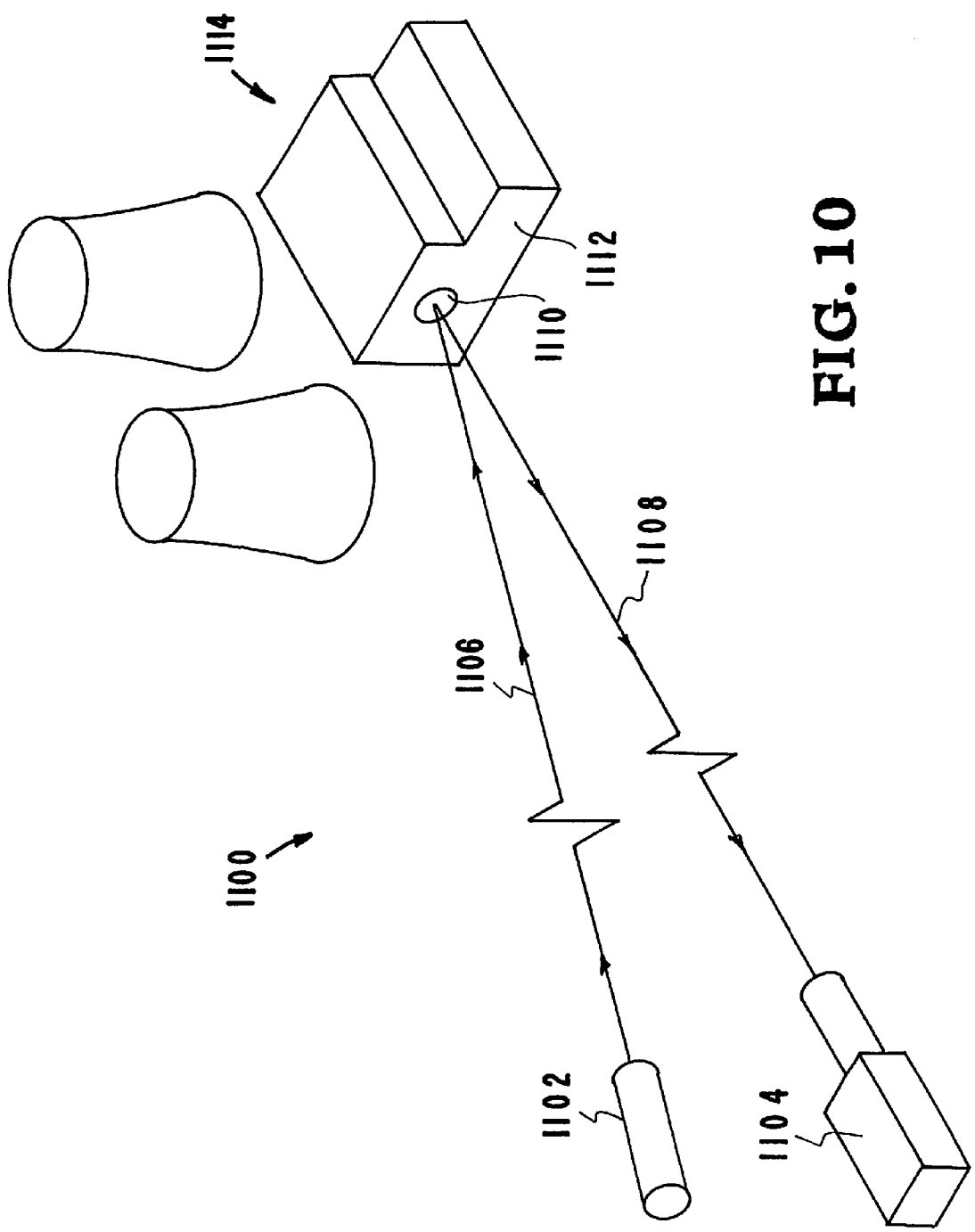
FIG. 10 is an illustration of a stand-off monitoring system.

FIG. 10 illustrates a stand-off monitoring system where a laser heat source 1102 sends a beam 1106 to heat an area 1110 on the treated surface 1112 of a target structure 1114. If the heated area 1110 has been irradiated thermal luminesce will be detected the detector system (telescope, camera or photomultiplier) and the detected information can be analyzed and stored for use at some future time.

Applicant's enhanced multifunctional paint can be easily pealed from surface as single sheet for retrieval and reading. These paints can be used for preventing contamination of systems in nuclear service, and for aiding in enabling easy decontamination during after work is complete.

Scintillating Paints for Instantaneous Detection

Alpha-Sensitive Scintillating Paints: The alpha-sensitive coating was made by mixing silver-doped zinc sulfide, ZnS(Ag), with a water-based polyurethane clear-coat paint. The ZnS(Ag) powder was obtained from Saint Gobain Crystals and Detectors of Newbury, Ohio, Part Number SP-1108, and was identified as Type Number Z151, received at LLNL on Jul. 7th 2005. The water-based clear-coat interior paint that was used as a binder for the zinc sulfide pigment is trade-named "Diamond Elite Water-Based (WB) Interior" and was selected since it had no ultraviolet inhibitors (absorbers). This paint was obtained from Rust-Oelum Corporation of Vernon Hills, Ill., as was marked with identification number 200041 dated November 2003. Based upon the Material Safety Data Sheet (MSDS), it is believed that this paint contains water, dipropylene glycol monomethyl ether, and dipropylene glycol monobutyl ether. A standard photomultiplier tube (PMT) was used to detect scintillations emitted during irradiation of the paint film with alpha particles from the Pu-239 source. Initial amplification of the current pulses from the PMT was done with a Video Optics Model RPS 2000 Preamplifier, which was incorporated into the base of the PMT, which also provided high-voltage to the tube.

Gamma-Sensitive Scintillating Paints: Gamma-sensitive organic coatings (paints) were prepared by mixing the Varathane interior clear coat and CsI(Tl) scintillation pigments, which were prepared by grinding CsI(Tl) plates. In a manner similar to that described for the preparation of water-based paints ZnS(Ag), these organic-based paints with CsI(Tl) were also applied to 1-inch and 2-inch glass slides, and placed on the surface of a 100-microCi Ra-226 gamma source. A Nikon 2DX 9-megapixel digital camera (5.4 micron pixel size) was then used to image scintillation from the painted surface during relatively brief (5 minute) time-lapse exposures.

Radiation Sources Used to Test Scintillating Paints: Several radiation sources were used to evaluate the radiation-sensitive paints. The invariant properties of these sources are summarized below.

Pu-239 Alpha Source
Cl-36 Beta Source
Cs-137 Gamma Source
Ra-226 Gamma Source
Thermoluminescent Paints for Integration and Dose Radiation sensitive paints capable of integrating dose have also been developed. These paints were prepared with the three size-fraction TLD-type pigments: coarse (−75/+53 micron); medium (−53+38 micron); and fine (−38 micron). As previously discussed, each coating was prepared with powder that was produced by millingTLD-700 Li-7 fluoride (7LiF) chips, taking the desired size fraction, and mixing it with a clear organic paint for high-temperature applications (PJH Brands SP-115 VHT Clear Coat). In all cases, the ratio of clear coat to powder was 10:4 by weight. First, the coating pigment was given a dose of >20,000 rad from a Co-60 gamma source, mixed with the clear coat paint, and then applied to a surface. The surface was then heated with a hotplate while the thermo-luminescent response was monitored with a photomultiplier tube. From the data obtained with these gamma-sensitive paints, the temperature threshold for interrogation was determined to be approximately 110 to 120° C. The signal intensity is less than that obtained with the coarser (−75+53 and −53+38 micron fractions) thermo-luminescent pigments. A slight optimum in performance may exist for the −53+38 micron size pigment, with the fine pigment having inferior performance. Each sample was then irradiated a second time, with a dose of ~50,000 rad, and interrogated. The thermo-luminescent response was measured as a function of temperature following the second irradiation. From these data, the temperature threshold for interrogation of these gamma-sensitive paints appears to be approximately 80 to 100° C. In comparison to the initial measurement, the threshold temperature for the onset of thermo-luminescence may have shifted to lower levels, but requires additional work to verify. The signal intensity from the fine pigments (−38 micron) is less than that obtained with the coarser pigments (−75+53 and −53+38 micron fractions), which is consistent with the initial irradiation. It also appears that a slight optimum in performance may exist for the −53+38 micron size pigment, with the fine pigment having inferior performance. In either case, a paint has been developed that is clearly capable of integrating gamma dose, and allowing interrogation upon heating to a modest temperature above ambient.

Parametric studies were conducted by Applicants to determine the detection threshold for the TLD-type paints, as well as the spectral response. The detection limit is being determined by alternately exposing the TLD-type paints to radiation, and then interrogating them by heating while simultaneously monitoring their luminescence with either a digital camera or a photomultiplier tube. A small spectrophotometer is being used to collect spectral data. Plans are underway to develop a stand-off monitoring system, where a laser is used to heat a spot on the painted surface, while the luminescence is monitored with a telescope and photomultiplier tube.

Although the description above contains many details and specifics, these should not be construed as limiting the scope of the application but as merely providing illustrations of some of the presently preferred embodiments of the apparatus, systems, and methods. Other implementations, enhancements and variations can be made based on what is described and illustrated in this patent document. The features of the embodiments described herein may be combined in all possible combinations of methods, apparatus, modules, systems, and computer program products. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments.

Therefore, it will be appreciated that the scope of the present application fully encompasses other embodiments which may become obvious to those skilled in the art. In the claims, reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device to address each and every problem sought to be solved by the present apparatus, systems, and methods, for it to be encompassed by the present claims. Furthermore, no element or component in the present disclosure is intended to be dedicated to the public regardless of whether the element or component is explicitly recited in the claims. No claim element herein is to be construed under the provisions of 35 U.S.C. 112, sixth paragraph, unless the element is expressly recited using the phrase "means for."

While the apparatus, systems, and methods may be susceptible to various modifications and alternative forms, specific embodiments have been shown by way of example in the drawings and have been described in detail herein. However, it should be understood that the application is not intended to be limited to the particular forms disclosed. Rather, the application is to cover all modifications, equivalents, and alternatives falling within the spirit and scope of the application as defined by the following appended claims.

The invention claimed is:

1. A method of detecting and mapping radiation on a surface using thermal luminescence from the radiation, comprising the steps of:
   providing scintillation particles;
   providing a neutron absorptive material;
   encapsulating said scintillation particles in said neutron absorptive material by coating said scintillation particles with said neutron absorptive material so that said neutron absorptive material entirely surrounds and encases said scintillation particles to produce a multiplicity of individual capsules with each capsule having a scintillation particle entirely surrounded and encased by said neutron absorptive material;
   providing a binder;
   combining said multiplicity of capsules and said binder creating a multifunctional paint that has scintillation particles coated with neutron absorptive material to enhance detection;
   providing a spray device;
   applying said multifunctional paint to the surface by spraying said multifunctional paint onto the surface with said spray device producing a coating of said multifunctional paint on the surface that has scintillation particles coated with neutron absorptive material to enhance detection;
   providing a laser that produces a laser beam;
   providing a photomultiplier that can detect the thermal luminescence from the radiation exposure;
   monitoring said coating of said multifunctional paint on the surface by interrogating said coating of said multifunctional paint on the surface with said laser beam from said laser and using said photomultiplier to detect the thermal luminescence from the radiation; and
   mapping the thermal luminescence from the radiation for detecting and mapping radiation on the surface.

2. The method of detecting radiation on a surface of claim 1 wherein said step of applying said multifunctional paint to the surface comprises applying said multifunctional paint to the surface in the form of a liquid.

3. The method of detecting radiation on a surface of claim 1 wherein said step of applying said multifunctional paint to the surface comprises applying said multifunctional paint to the surface in the form of a powder.

4. The method of detecting radiation on a surface of claim 1 wherein said enhance neutron absorptive material is boron.

5. The method of detecting radiation on a surface of claim 1 wherein said enhance neutron absorptive material is a boron-10 isotope.

6. The method of detecting radiation on a surface of claim 1 wherein said enhance neutron absorptive material is metastable boron-11.

7. The method of detecting radiation on a surface of claim 1 wherein said enhance neutron absorptive material includes materials capable of radionuclide chemisorption.

8. The method of detecting radiation on a surface of claim 1 wherein said enhance neutron absorptive material includes a coating of silica.

9. The method of detecting radiation on a surface of claim 1 wherein said enhance neutron absorptive material includes a coating of carbon aerogel.

10. The method of detecting radiation on a surface of claim 1 wherein said step of monitoring said coating of said multifunctional paint on the surface utilizes a stand-off monitoring system.

11. The method of detecting radiation on a surface of claim 10 wherein said stand-off monitoring system utilizes a laser heat source that sends a beam to heat said multifunctional paint on the surface and produce the thermal luminesce.

12. The method of detecting radiation on a surface of claim 11 wherein the thermal luminesce is detected by a detector system.

13. The method of detecting radiation on a surface of claim 12 wherein said detector system includes a camera.

14. The method of detecting radiation on a surface of claim 12 wherein said detector system utilizes said photomultiplier and said camera.

15. A paint system that detects and maps radiation emanating from a surface using thermal luminescence from the radiation, comprising:
   an enhanced multifunctional paint that includes
   a multiplicity of individual capsules wherein each individual capsule has
   a scintillation particle and
   a coating of neutron absorptive material on said scintillation particle that entirely surrounds and encases said scintillation particle thereby producing said individual capsule, said coating that entirely surrounds and encases said scintillation particle producing said individual capsule and enhances detection of radiation; and
   a binder combined with said multiplicity of individual capsules, wherein said multiplicity of individual capsules and said binder produce said multifunctional paint;
   a system for applying said multifunctional paint onto the surface by spraying said multifunctional paint onto the surface producing a multifunctional paint coating on the surface that includes said scintillation particles coated with said neutron absorptive material to enhance detection,
   a monitoring system for monitoring said multifunctional paint coating on the surface that includes a laser that produces a laser beam and a photomultiplier by interrogating said multifunctional paint coating on the surface using said laser beam from said laser and using said photomultiplier to detect the thermal luminescence from the radiation; and
   a mapping system for mapping the thermal luminescence from the radiation providing a paint system that detects and maps radiation emanating from the surface.

16. The paint on a surface that detects and maps radiation of claim 15 wherein said coating of neutron absorptive material on said scintillation particle comprises a coating of materials capable of radionuclide chemisorption.

17. The paint on a surface that detects and maps radiation of claim 16 wherein said coating of materials capable of radionuclide chemisorption comprises silica.

18. The paint on a surface that detects and maps radiation of claim 16 wherein said coating of materials capable of radionuclide chemisorption comprises carbon aerogel.

* * * * *